Patented Sept. 28, 1937

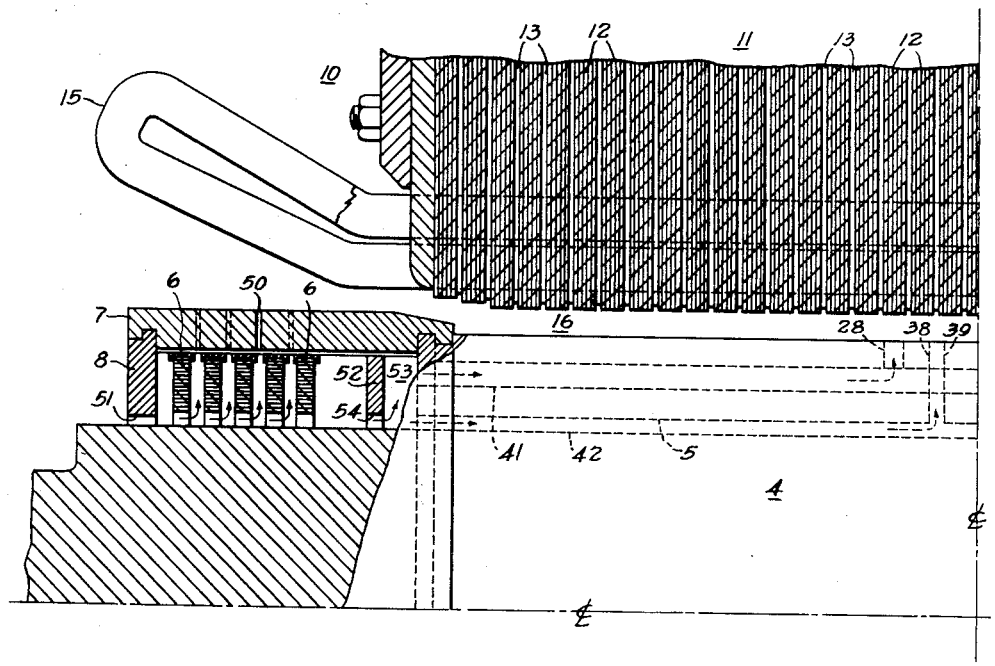

2,094,358

UNITED STATES PATENT OFFICE 2,094,358

TURBINE-GENERATOR VENTILATION

Lee A. Kilgore, Forest Hills, and Bennie A. Rose, Swissvale, Pa., assignors to Westinghouse Electric & Manufacturing Company, East Pittsburgh, Pa., a corporation of Pennsylvania Application May 29, 1936, Serial No. 82,432

6 Claims. (Cl. 172—252)

Our invention relates to improved ventilating means whereby a significant increase may be made in the rating of a large turbine generator of any given size, as compared with prior-art turbine generators of the same size.

Turbine generators are characterized by their high speed of operation, resulting in a rotor construction of much greater longitudinal length than diameter. Because of this peculiarity of the rotor construction, the rotor has a strong tendency to become overheated, and this is frequently the limiting factor in determining the permissible rating of the entire generator.

An object of our invention is to provide for a direct transfer of heat from the rotor conductors to the cooling medium, without requiring the heat to pass through portions of the rotor core, thereby making it possible to reduce the diameter of the rotor member and to put more material into the stator member so as to increase the number of kilovolt-amperes which may be obtained from a turbine generator having a given overall diameter.

A more specific object of our invention is to provide either lateral ventilating slots, or bottom ventilating slots, or both, milled in the sides and bottoms, respectively, of the conductor-receiving slots of the rotor core of a turbine generator, in combination with metallic slot-cells which serve to hold the rotor-conductors in place in the slots and to conduct heat away from the same.

A further object of our invention is to utilize, in combination with the longitudinal slot-ventilating ducts previously mentioned, a special ventilation-controlling guard-means in the end-connections of the rotor member, for preventing the radial ventilating passageways of the end-connections from bypassing the passageways in the sides and/or bottoms of the rotor slots.

A still further object of our invention is to utilize, in combination with the ventilated rotor slots as previously mentioned, a slot-closing wedge which is made of metal, so as to have a good heat-conducting capacity, and a metal slot-cell construction which is in good thermal heat-exchange relation with the metal wedge, whereby heat is transferred more readily to the air-gap of the machine.

With the foregoing and other objects in view, our invention consists in the broad combinations and details of structure and arrangement hereinafter described and claimed, and illustrated in the accompanying drawing, wherein:

Figure 1 is a longitudinal sectional view of a portion of a turbine generator embodying our invention in one exemplary form, a portion of the rotor member being indicated in elevation; and Figs. 2, 3 and 4 are detail views showing the rotor slot-shape and the arrangement of rotor-conductors and slot-cells therein, in several different forms of embodiment of our invention.

Our invention is illustrated as being applied to a three-phase turbine generator comprising a smooth-core rotor-member 4 having direct-current exciting windings or coils comprising rotor-conductors 5 and rotor end-connections 6, the end-connections being retained against centrifugal force by means of a steel retaining-ring 7 and an end-plate 8 at each end of the rotor-member.

The machine is also provided with a stator-member 10 comprising a stator-core 11 which is built up of packs or stacks of laminations or punchings 12, the various packs being separated by radial vents 13. The stator-core 11 is of annular or ring-shape, and is provided, at its inner periphery, with slots for receiving the coil-sides of the polyphase armature winding 15. The stator-member is separated from the rotor-member by an air-gap 16.

The general method of applying the principles of our axial vent-ducts on the sides of the conductor-receiving slots in the rotor-member is shown in Fig. 2. The conductor-receiving slot 20, in accordance with a common practice, is preferably given a stepped-slot configuration, so as to receive rotor-conductors 5 consisting of two different widths of superposed copper bars, the smaller widths being at the bottom of the slot, where the space is more restricted by reason of the smaller diameter. The special features which we have incorporated in the slot shown in Fig. 2 consist only in the utilization of axial or longitudinally extending vent-slots 22 which are milled in the sides of the conductor-receiving slot, and in the addition of steel strips 24, on each side, to protect the mica cell 26 which surrounds the rotor-conductors 5. The steel strips 24 prevent the rotor-conductors 5 from breaking through the mica cell 26 and becoming displaced laterally into the vent-slots 22 on either side of the conductor-receiving slots. The air enters the vent-slots 22 at each end of the rotor-member and travels axially into the rotor-member, being discharged radially, near the center of the rotor-member, by any suitable radial-vent means such as would be provided by a large radial hole 28 drilled into the rotor-member, near the center of the machine, on the center-line of each of the slots, as indicated in dotted lines in Figs. 1 and 2.

Fig. 3 shows a modification of our invention in which the lateral vent-ducts 22 are not utilized, but a bottom vent-duct 29 is utilized, extending axially below each of the rotor-conductor-receiving slots 30. In this form of our invention, we preferably utilize a metal cell or slot-liner 32 for at least the bottom and at least the lower portion of the side walls of each of the conductor-receiving slots 30, said slot-liner having a projecting-portion 34 which projects into the axial ventilating duct or groove 29 which is milled in the bottom wall of the conductor-receiving slot 30. This metal cell or slot-liner 32 may be made of copper or aluminum of sufficient thickness to have the requisite strength mechanically. This cell serves to materially increase the heat-transfer from the conductors by providing a heat-transfer surface of about 2.5 times the axial-duct surface, and by aiding in conducting the heat down the tooth, from the bottom portions of the rotor-conductors 5, as distinguished from the usual construction in which the heat-transfer from the rotor-conductors is almost altogether up the tooth toward the air-gap of the machine. The downwardly projecting portion 34 of the metallic slot-liner in Fig. 3 is preferably perforated, as indicated at 36, to facilitate flow of gaseous cooling medium into and out of the projecting portion or loop 34 of the metal cell 32. The air enters the axial vent-ducts 29 at each end of the rotor-member, and travels axially into the rotor-member, being discharged from the vent-ducts 29 by any suitable radial ventilating-means disposed near the center of the machine, such means being indicated, in one exemplary form, as consisting of intersecting inclined and radial holes 38 and 39 which are bored from the outer periphery of the rotor-member into each of the axial vent-ducts 29, somewhere near the center of the machine, as indicated in Figs. 1 and 3.

The ventilating-means shown in Figs. 2 and 3 can obviously be combined, so as to obtain the benefits of both means for cooling the rotor-conductors 5, and in general, it will be desirable to combine the two methods, as indicated, in one exemplary form of embodiment, in Fig. 4. In this embodiment of our invention, each conductor-receiving slot 40 of the rotor-member is not only milled, in its side-walls, to provide side-wall vent-ducts 41, as in Fig. 2, but it is also milled in its bottom wall, to provide a bottom-wall vent-duct 42. The rotor-conductors 5 are enclosed in a slot-cell 26 of insulating material, usually mica, and this cell, in the embodiment of our invention shown in Fig. 4, is encased in a complete aluminum cell 44 which eliminates the need for the steel strips 24 of Fig. 2, and which provides for heat-conduction both up and down the slot. Preferably, the slot-wedge 46, which closes the top of the conductor-receiving slot 40, is made of aluminum or other good heat-conducting material, and the aluminum cell 44 is disposed in good heat-exchanging relation to the aluminum wedge 46, thereby facilitating the upward transfer of heat from the rotor-conductors 5. As in Fig. 3, the aluminum cell 44 of Fig. 4 is provided with a downwardly extending loop-portion 47 projecting down into the bottom-wall vent-duct 42, said downwardly projecting portion 47 being perforated as indicated as 48.

In all of the forms of embodiment of our invention, it is desirable to provide special ventilating-means at the ends of the rotor-member, in order to provide, not only for the proper and necessary ventilation of the rotor end-connections 6, but also for the proper and necessary flow of the ventilating-medium into the various axial rotor vent-ducts which have been previously described. In order to properly cool the rotor end-connections 6, it is customary to provide the retaining-ring 7 with perforations 50, and to cause the end-plate 8 to be apertured as indicated at 51, for the admission of an ambient gaseous medium at points which are closer to the shaft than the bottoms of the end-connections 6. The air thus enters the aperture or apertures 51 and passes radially outward between the various end-connections 6, this movement of air being caused by the centrifugal action of the fast-rotating rotor-member 4.

In order that the retaining-ring perforations 50 shall not bypass the gaseous cooling medium which should enter the axial ducts which we mill along the conductor-receiving slots of the rotor-member, we very much prefer to provide some sort of annular ventilating-controlling guard-means 52, disposed in the end-winding connections at points which are spaced from the respective ends of the rotor-core a sufficient distance to admit of free access of the gaseous ventilating medium to the open ends of the axial vent-ducts, said annular guard-means being disposed, however, sufficiently close to the respective ends of the rotor-core to prevent the annular space 53 at the ends of the vent-ducts from being in communication with any of the perforations 50 in the retaining-ring 7. The gaseous medium which enters our axial vent-ducts of the rotor-member thus comes from points 54 (underneath the guard-means 52) which are at least approximately as close to the shaft as the bottom of the rotor-conductors 5, or the top of the bottom-wall vent-ducts 42, so that full advantage is taken of the centrifugal force developed by reason of the difference in radius between the intake-points 54, at the ends of the rotor-member, and the discharge-points, at the outer peripheries of the radial discharge ducts 28, 38 and 39 near the center of the rotor-member 4, where the gaseous cooling medium is discharged into the air-gap 16.

The particular slot-structures which are shown in Figs. 2, 3 and 4 are drawn for a large 3600 R. P. M. machine, that is, for a two-pole 60-cycle turbine generator. It is apparent, however, that our ventilating system would be even more effective in a large 1800 R. P. M. machine, or four-pole machine, where the conductor-receiving slots are about twice as deep as in the two-pole machine, so that the conduction of heat from the rotor-conductors lying in the bottom of the slots is about twice as difficult a problem. In general, we believe that it will be found that our axial-duct ventilating-means, as shown in Figs. 1 and 4, will make possible a 10% increase in ampere-turns for most large two-pole turbine generators over the ampere-turns which are obtained with conventional ventilating means heretofore utilized, and a 20% increase in ampere-turns for most large four-pole turbine generators.

While we have illustrated our invention in several preferred forms of embodiment, it will be obvious that the invention is susceptible of embodiment in various other detailed manners of construction without departing from the essential spirit and results which we obtain. We desire, therefore, that the appended claims shall be accorded the broadest interpretation consistent with their language and the prior art.

We claim as our invention:

1. A dynamo-electric machine comprising a slotted rotor-core, a plurality of conductors disposed in superposed relation in each of a plurality of conductor-receiving slots of said core, said conductor-receiving slots having grooves in the side walls thereof, the grooves of any slot being above the bottom and below the top of the plurality of conductors of that slot, a metal sheet disposed between each side-wall groove and its associated superposed conductors for confining the superposed conductors to the main portion of the slot in which they are disposed, and radial vent-means disposed centrally of the stator-core in communication with said side-wall grooves.

2. A dynamo-electric machine comprising a slotted rotor-core, a plurality of conductors disposed in superposed relation in each of a plurality of conductor-receiving slots of said core, said conductor-receiving slots having grooves in the bottom walls thereof, a metallic slot-liner for at least the bottom and at least the lower portion of the side walls of each of said conductor-receiving slots, each of said slot-liners having at least one projecting-portion projecting into the bottom wall groove of its slot, and radial vent-means disposed centrally of said rotor-core in communication with said grooves.

3. A dynamo-electric machine comprising a slotted rotor-core, a plurality of conductors disposed in superposed relation in each of a plurality of conductor-receiving slots of said core, said conductor-receiving slots having grooves in the bottom walls thereof, a metallic slot-liner for at least the bottom and at least the lower portion of the side walls of each of said conductor-receiving slots, each of said slot-liners having a downwardly extending perforated duct-portion projecting into the bottom-wall groove of its slot, and radial vent-means disposed centrally of said rotor-core in communication with said grooves.

4. A dynamo-electric machine comprising an open-slotted core, a plurality of conductors disposed in superposed relation in each of a plurality of conductor-receiving slots of said core, said conductor-receiving slots having grooves in the side and bottom walls thereof, a wedge of reasonably good heat-conducting material closing the top of each of the respective conductor-receiving slots, a metallic slot-liner in each of said conductor-receiving slots, the top of said slot-liner being in reasonably good heat-exchanging relation to the associated wedge, each of said slot-liners having at least one projecting-portion projecting into at least one of said grooves, and means for causing an axial flow of a gaseous medium in each of the grooves.

5. A dynamo-electric machine comprising a slotted rotor-core, a plurality of conductors disposed in superposed relation in each of a plurality of conductor-receiving slots of said core, said conductor-receiving slots having grooves in the side and bottom walls thereof, a metallic slot-liner in each of said conductor-receiving slots, each of said slot-liners having at least one projecting-portion projecting into at least one of said grooves, radial vent-means disposed centrally of said rotor-core in communication with said grooves and annular ventilation-controlling guard-means at the respective ends of the rotor-core, for causing the ambient gaseous medium which enters each of the side-wall grooves to come from a point which is at least as close to the axis of the rotor-core as the top of the bottom-wall grooves.

6. A dynamo-electric machine comprising a slotted rotor-core, a plurality of conductors disposed in superposed relation in each of a plurality of conductor-receiving slots of said core, said conductor-receiving slots having grooves in the side and bottom walls thereof, the side-wall grooves of any slot being above the bottom and below the top of the plurality of conductors of that slot, a metal sheet disposed between each side-wall groove and its associated superposed conductors for confining the superposed conductors to the main portion of the slot in which they are disposed, radial vent-means disposed centrally of the stator-core in communication with said side-wall and bottom wall grooves of said conductor-receiving slots, rotor end-winding connections at each end of the rotor-core, a perforated retaining ring around the end-winding connections at each end of the rotor-core, an end-plate engaging the outer end of each retaining ring, each end-plate being apertured for the admission of an ambient gaseous medium at points which are all substantially as close to the rotor-axis as the bottom of the end-winding connections, and ventilation-controlling guard-means, disposed in the end-winding connections at points closely spaced from the respective ends of the rotor-core, for causing the ambient gaseous medium which enters each of the side-wall grooves to come exclusively from points which are at least substantially as close to the rotor-axis as the bottom of the end-winding connections.

LEE A. KILGORE.
BENNIE A. ROSE.